July 7, 1931.    J. A. SWINDLE    1,813,100
ORIFICE FITTING
Filed Feb. 4, 1929

JOHN A. SWINDLE
INVENTOR

By Paul W. ~~~~~~~
ATTORNEY

Patented July 7, 1931

1,813,100

UNITED STATES PATENT OFFICE

JOHN A. SWINDLE, OF MAYWOOD, CALIFORNIA

ORIFICE FITTING

Application filed February 4, 1929. Serial No. 337,325.

The object of my invention is to permit the substitution of one orifice for another in a device for measuring the rate of flow of fluids through pipes, without labor and without materially interrupting the flow.

The rate of flow of relatively small quantities of fluids is usually measured in positive meters by direct displacement, but in measuring the flow of large quantities of fluid, and particularly of gases and vapors, it is customary to pass the flow through a constriction in the channel, to measure the difference in pressure between the two sides of the constriction, and to determine the flow rate by calculation. Given the size of the orifice, the positive pressures and the differential pressure, the flow rate for a fluid of known properties may be readily and accurately calculated, and for many fluids may be taken from established and well known tables.

The constriction used for this purpose usually takes the form of an orifice or round hole in a plate of hard and relatively thin metal, such plate being clamped between flanges interposed in the pipe channel through which the flow is being conducted, the plate being so placed between these flanges that the orifice is substantially concentric with the pipe. In order to change from one orifice to another it is necessary, with the arrangements heretofore used, to shut off the flow on each side of the flanges by means of valves, to slacken or remove the bolts holding the flanges together, to remove one plate and substitute another, and to again make up the flanges. The operation is laborious and further, the stoppage of the flow is often highly detrimental to operations in which the continuous flow of a fluid is essential.

In the application of my invention, as will appear, one orifice may be substituted for another by merely swinging a hand lever from one position to another, and the flow is stopped only during the inappreciable period during which a blank portion of the plate is in register with the pipe.

An illustrative embodiment of my invention is shown in the attached drawings, in which.

Figures 1, 2:
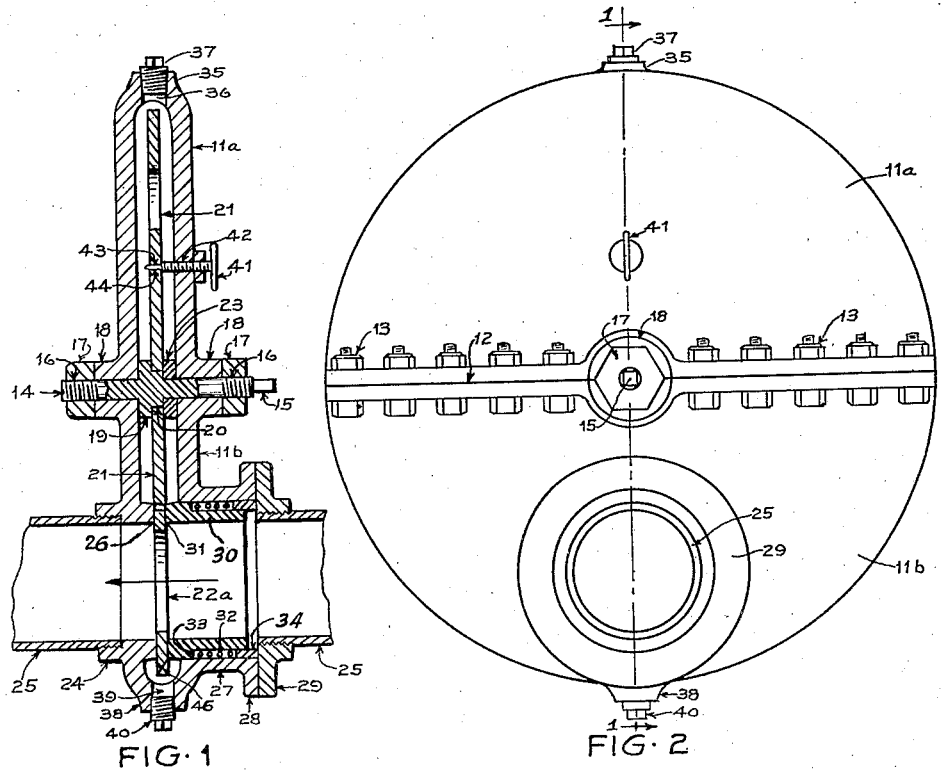
Fig. 1 shows the device in vertical cross section, taken on line 1—1 of Fig. 2.
Fig. 2 shows the device in elevation on the intake side.
Figure 3:
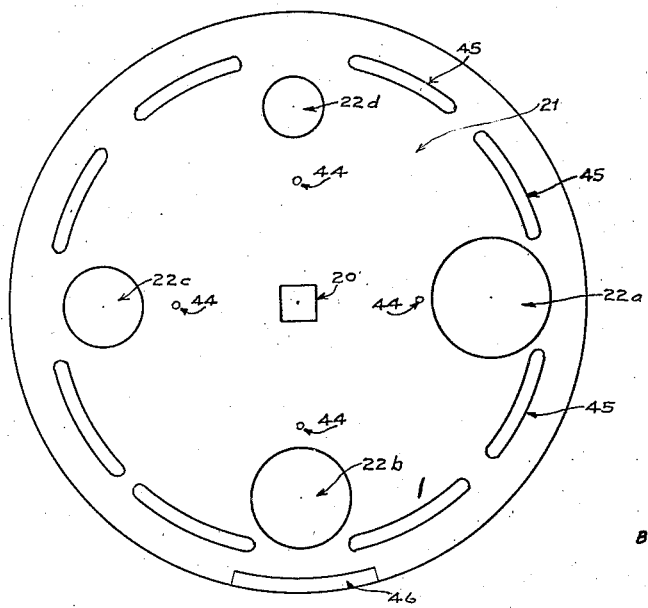
Fig. 3 is a detail of a plate containing four orifices.

Referring to the drawings, 11a and 11b are the two halves of a relatively rigid case split along its horizontal center line as indicated at 12, the halves being held together by the bolts and nuts 13—13. Through the center of this case passes a shaft 14 having a squared end 15 adapted to fit a wrench or key. The ends of this shaft are threaded, as at 16, to fit the nuts 17. These nuts should be carefully faced off to make a tight bearing against the hubs 18, which project from the center of the case as shown. At an appropriate intermediate point on this shaft is formed a flange 19, a portion of the thickness of which is squared as shown at 20 in Figs. 1 and 3. Plate 21, in which orifices 22a, 22b, 22c and 22d are formed, is held against the flange 19 by a washer 23 which bears against the face of the plate and against the inner face of the case 11. By means of this squared portion the plate is caused to revolve when the squared end 15 is turned by means of a wrench or key.

On the outer face of one side of the case is formed a pipe flange 24 adapted to fit the pipe 25 in which the orifice is to be placed. On the inner face of the same side of the case is formed a raised seat 26 faced off to fit nonleakably against the orifice plate 21. The orifices 22a—22d should be placed with their centers equally distant from the center of the orifice plate 21, this distance being such that each orifice may be exactly concentric with the circular seat 26 when the orifice is disposed in the proper vertical position.

On the opposite side of the case is formed a nozzle 27 bearing a faced flange 28 to which is fitted a detachable flange 29, threaded to fit another section of the pipe 25. Flanges 28 and 29 should be held in contact by bolts or other suitable means not shown.

The nozzle 27 is bored out inside to a diameter greater than that of the pipe in which the instrument is to be placed, and within this bore is placed a movable seat 30 which is faced at 31 to form a non-leaking contact with that face of the orifice plate opposite that which contacts with seat 26. A stiff coil spring 32 is adapted to bear against an annular projection 33 formed on this seat and the spring is placed in compression by means of a slip ring 34, which is brought to a sliding fit on the ring 30 and which engages the spring at one end and the detachable flange 29 at the opposite end. By adjusting the length of this collar and the length and stiffness of the spring, the seat 31 may be forced against the orifice plate under any desired pressure when the flange 29 is brought to bear against the flange 28.

At the top of the case is formed a boss 35 which is bored out as at 36 and may be fitted with a screwed plug 37 or with a pipe nipple and valve not shown. The object of this upper opening is to enable a lubricating medium to be poured into the case to keep the parts from rusting or corroding and to enable the disk to be freely turned by means of the squared end 15. A similar boss 38 bored as at 39 and fitted with a plug 40 may be placed at the lower side of the case for the purpose of draining contaminated lubricant or any condensate which may collect within the case.

A hand screw 41 threaded into the case as at 42 and provided with a tapering end 43 of reduced diameter is adapted to register with the small holes 44 and to hold the plate in such position that any one orifice may be brought into exact vertical register with the seats 26 and 31.

It is desirable though not essential that auxiliary openings as indicated at 45—45 be formed as slots through the plate in approximately the position shown in 33. These slots should be so spaced from the center of the plate that the bottom of whichever slot may be downward will register with the bottom of the seats 26 and 31. These slots should be arcuate and have their long edges formed of curves which extend concentrically with relation to the center of rotation of the plates. The purpose of these slots is to relieve the pressure on the intake side of the plate when turning from one orifice to the next, thus enabling the plate to be freely turned. When placed in the position indicated they have the further function of directing a narrow stream of fluid under high velocity along the bottom of the pipe channel 25, thus scouring off any liquid condensate which may collect in meters used for measuring the flow of gas, which condensate, if not removed, may affect the area of the orifice.

In substituting an orifice of a different size within the range of sizes on a single plate, the two nuts 16 may be slightly slackened and the thumb nut 41 turned back until the projection 43 is withdrawn from the hole 44. The plate may then be freely turned by fitting a wrench or key on the squared end 15. When the proper orifice has been brought into position the thumb nut 41 is run down until the projecting end enters the corresponding hole 44 and thus locks the plate against further revolution, after which the nuts 16 should be tightened to prevent leakage around the shaft.

In the case of large pipe diameters it may be undesirable to place more than three, or even two, orifices in a single plate. In such case a plurality of plates having orifices of different sizes may be provided and these plates may be interchanged by removing the bolts 13 which hold the halves of the case in position, lifting off the upper half of the case, removing the shaft and the orifice plate, lifting the plate from the shaft, replacing it with another plate having the desired openings and reversing the above said movements.

The travel of the ring seat 30 should be such that when the orifice plate is thus lifted out the seat 31 will bear against the seat 26, forming a substantially nonleaking annular contact and thus providing a continuous channel for the flow of fluid through the pipe 25 while the plate is thus withdrawn. It is desirable that a small portion of the edge of the plate be brought to a feather edge as indicated at 45 in Figs. 1 and 3 in order that when the plate is inserted the sliding ring 30 may be forced back to admit the thickness of the plate.

My improved orifice fitting should always be placed in the line in such position that the fluid enters on the side provided with the slip ring 30, as this permits the rigid seat 26 to take whatever thrust results from the restriction of area by a small orifice. If the direction of flow should be reversed from that indicated by the arrow in Fig. 1, the plate would have a bearing only on the spring supported slip ring 30 which is practically free to retract, and serious distortion of the plate and leakage of fluid into the case might result.

I claim as my invention:

1. In an orifice fitting provided with a tubular channel and containing a plate interposed across said channel and provided with an orifice: an arcuate slot formed in said plate and positioned to register with the lower portion of said channel and to provide a means of communication between the two sides of said fitting when said orifice is out of register with said channel.

2. An orifice fitting including a rotatable plate provided with a plurality of orifices which are spaced circumferentially apart with relation to the center of rotation of said plate, a case for said plate, a passage for fluid through said case, the rotation of said plate bringing said orifices successively into register with said passage, and means within said case for directing said fluid through said orifices and for preventing said fluid from passing over the edge of said plate, there being a series of auxiliary openings through said plate which are adapted to conduct relatively small amounts of fluid through said plate while said plate is being turned to move one of said orifices out of register with said passages and to align another of said orifices therewith.

3. In an orifice fitting provided with a tubular channel and containing a pivotally mouned plate interposed across said channel and provided with a plurality of orifices circumferentially spaced with relation to the pivotal mounting of said plate, slots being formed in said plate and positioned to register with said channel and to provide a means of communication between the two sides of said fitting whenever the space between two adjacent orifices is in register with said channel.

4. In an orifice fitting provided with a tubular channel and containing a pivotally mounted plate interposed across said channel and provided with a plurality of orifices circumferentially spaced with relation to the pivotal mounting of said plate, there being a series of arcuate slots in said plate which are adapted to conduct relatively small amounts of fluid through said plate while said plate is being turned to move one of said orifices out of register with said passage and to align another of said orifices therewith, the edges of said slots being concentric with the center of rotation of said plate.

In witness that I claim the foregoing I have hereunto subscribed my name this 26 day of January, 1929.

JOHN A. SWINDLE.